W. J. BAUER.
BAKING UTENSIL.
APPLICATION FILED SEPT. 27, 1917.
1,278,422.
Patented Sept. 10, 1918.
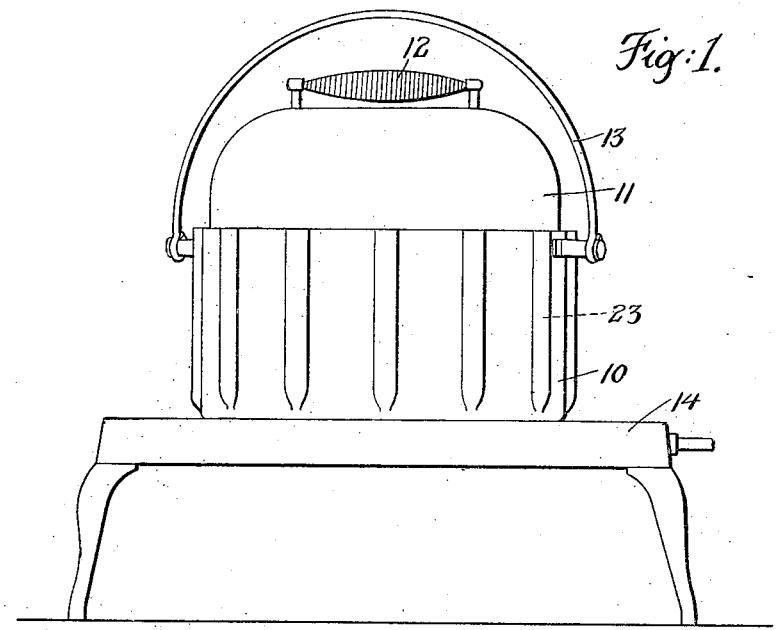
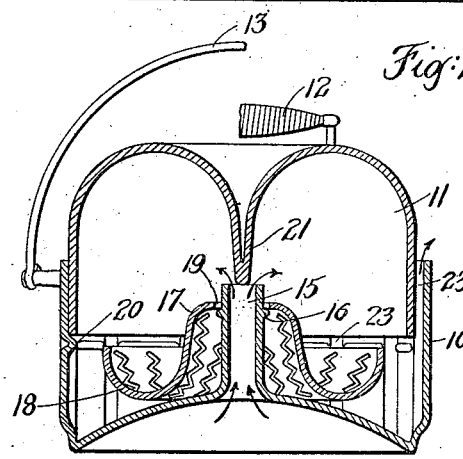
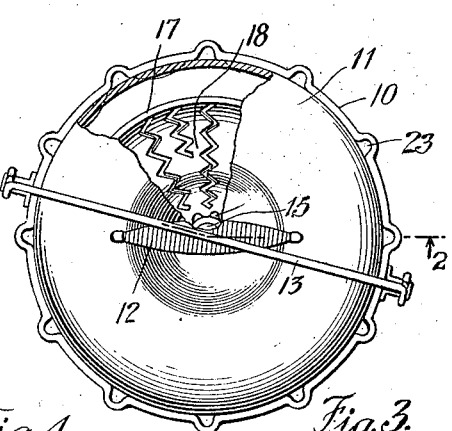
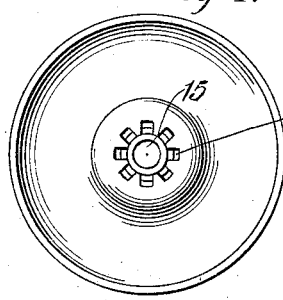
INVENTOR
William J. Bauer
BY
Fred'k Schmitz
ATTORNEY

UNITED STATES PATENT OFFICE.

WILLIAM J. BAUER, OF NEW YORK, N. Y.

BAKING UTENSIL.

1,278,422.     Specification of Letters Patent.     Patented Sept. 10, 1918.

Application filed September 27, 1917. Serial No. 193,410.

*To all whom it may concern:*

Be it known that I, WILLIAM J. BAUER, a citizen of the United States, and a resident of New York, in the county of New York and State of New York, have invented certain new and useful Improvements in Baking Utensils, of which the following is a specification.

The invention relates to a baking device or apparatus adapted to receive vegetables, fruits, meat and similar substances to be baked, and more particularly suitable for use in connection with a gas or oil range or other suitable heating device. It has for its object to provide a simple and inexpensive utensil of this character which will efficiently bake the material contained therein and which is so constructed that the various parts composing same may be readily disassembled for the removal of the baked product and for cleaning.

In the accompanying drawings, which illustrate the invention—

Figure 1 illustrates an elevation of the improved baker mounted upon a gas range.

Fig. 2 is a vertical section through the baker.

Fig. 3 is a plan with a portion broken away to disclose the interior of the baker.

Fig. 4 illustrates a modified form of rack or tray.

Similar characters of reference designate corresponding parts throughout the several views.

Referring to the drawings, the baker is shown to consist of an outer vessel or receptacle 10 into which fits an inverted, concaved vessel or cover 11, the latter being provided with a suitable handle 12 to facilitate removal of the said cover, and the former with a bail 13. The utensil is so constructed that the bottom of the outer vessel 10 rests upon the top of a suitable device for supplying heat, for example, a gas range 14, although the use of the baker is not restricted to this particular heat-supplying apparatus.

As indicated more clearly in Fig. 2 of the drawings, the bottom of the outer receptacle 10 is turned inwardly or dome-shaped, its circumference resting upon the top of the gas range 14 and is concave with respect thereto and the heat supply thereof.

At the central portion, the inturned or concave bottom is directed inwardly to form a tube or flue 15 which extends into said receptacle to a short distance below the top of same. Near the upper end of said flue, there is provided upon its outer surface a peripheral ridge 16 which is designed to receive and support a perforated rack or tray 17 fitting over the said flue 15 and within the receptacle 10. Rack 17 may be variously shaped and constructed, and is shown herein as having an annular bottom portion 18 designed to receive the material to be baked, and preferably raised above the inturned bottom of receptacle 10. This tray may be suitably perforated over the bottom, as shown in Figs. 2 and 3, to permit the heated air or gases to pass through; or, for certain purposes, it may be of solid material, as indicated in Fig. 4. In either case, however, it is preferred to provide suitable openings 19 at its central portion which fit about the flue 15.

The said receptacle 10 is provided with a circular inwardly-directed bead 20 designed to provide a support for the cover 11, the central dividing wall 21 of which projects toward the outlet flue 15, extending substantially to the outer edge thereof or slightly into the same. In this manner, the heated air and gases entering through the said flue 15 from the range or the like 14 are divided and reflected through the spherical walls of said cover into the rack 17, to which heat is also radiated from the bottom of the receptacle 10. Thus, the material retained by said rack is exposed on both sides to the heat and properly baked, the cover being designed to fit snugly within the receptacle 10.

In order to provide for a circulation through the baker and for the removal of the heated air and gases, vertical channels or grooves 23 are formed around said receptacle in the wall thereof, for example, being forced outwardly therefrom. These channels thus serve as flues or vents and induce the desired circulation, substantially as indicated by the arrows.

The construction hereinbefore described affords a simple and efficient device for properly directing the heated air or gases upon both sides of the material to be baked, and may be constructed inexpensively, for example, of sheet metal, forming a compact device of pleasing appearance. In the use of a device of this character, considerable economy of fuel results, especially where but a small portion is to be baked, as it is not necessary to first heat up an oven of proportionately large size, in accordance with the present practice.

I claim:

1. A baker, comprising: a receptacle having vertical flues formed in the wall thereof, and an inwardly directed flue; a rack or tray mounted over said flue; and a removable cover fitting within said receptacle.

2. A baker, comprising: a receptacle having vertical flues formed in the wall thereof, and an inwardly directed flue provided with a support; a rack or tray retained by said support; and a removable cover supported by said receptacle.

3. A baker, comprising: a receptacle having vertical flues formed in the wall thereof, provided along its wall between the top and bottom with a circular beading directed inwardly, and having a flue inwardly directed from the bottom of said receptacle provided with a support; a rack or tray retained by said support; and a removable cover resting upon and supported by the beading of said outer receptacle.

4. A baker, comprising: a receptacle having vertical flues formed in the wall thereof, provided along its wall between the top and bottom with a circular beading directed inwardly, and having a flue inwardly directed from the bottom of said receptacle provided with a support; a rack or tray retained by said support; a removable cover resting upon and supported by the beading of said outer receptacle; withdrawing means attached to said cover; and a bail secured to the outer receptacle.

5. A baker, comprising: a receptacle having vertically corrugated walls to provide suitable vents, and a flue inwardly directed from the bottom of said receptacle provided with a support; a rack or tray retained by said support; and a removable cover supported by said receptacle.

6. A baker, comprising: a receptacle having vertically corrugated walls to provide suitable vents, and an inwardly directed, centrally located flue extending from the bottom of said receptacle to below the top of same and provided with a support; a rack or tray retained by said support; and a removable cover supported by said receptacle.

7. A baker, comprising: a receptacle having vertically corrugated walls to provide suitable vents, and an inwardly directed, centrally located flue extending from the bottom of said receptacle to below the top of same and provided with a support; a rack or tray retained by said support out of contact with the bottom of said receptacle; and a removable cover supported by said receptacle.

8. A baker, comprising: a receptacle having vertically corrugated walls to provide suitable vents, and an inwardly directed, centrally located flue extending from the bottom of said receptacle to below the top of same and provided with a support; a rack or tray retained by said support and having an annular retaining portion; and a removable cover supported by said receptacle.

9. A baker, comprising: a receptacle having vertical flues formed in the wall thereof, and a flue directed inwardly from the bottom of said receptacle provided with a support; a rack or tray retained by said support; and a removable concaved cover, the central portion thereof being directed toward the flue of the receptacle, and said cover being supported by the said receptacle.

10. A baker, comprising: a receptacle having vertical flues formed in the wall thereof, provided along its wall between the top and bottom with a circular beading directed inwardly, and having a flue inwardly directed from the bottom of said receptacle provided with a support; a rack or tray retained by said support; and a removable concaved cover, the central portion thereof being directed toward the flue of the receptacle, and said cover being supported by the said receptacle.

Signed at New York in the county of New York and State of New York this 21 day of September, A. D. 1917.

WILLIAM J. BAUER.

Witness:
 LAURA E. SMITH.